US012763487B2

(12) United States Patent
Nunes et al.

(10) Patent No.: US 12,763,487 B2
(45) Date of Patent: Oct. 13, 2026

(54) METHOD FOR COMPENSATE CAVITY EFFECT IN AIRCRAFT EMBEDDED ANTENNA IMPEDANCE AND EMBEDDED ANTENNA ARRAY FOR AIRCRAFT

(71) Applicants: EMBRAER S.A., São José dos Campos-SP (BR); INATEL / FUNDAÇÃO INSTITUTO NACIONAL DE TELECOMUNICAÇÕES, Santa Rita do Sapucaí-MG (BR)

(72) Inventors: Sidney Osses Nunes, São José dos Campos-SP (BR); Leandro Napoli Bellei, São José dos Campos-SP (BR); Rodrigo Rodrigues De Assis, São José dos Campos-SP (BR); Juliano Vilela De Carvalho, São José dos Campos-SP (BR); Arismar Cerqueira Sodre Junior, São José dos Campos-SP (BR); Luís Gustavo Da Silva, São José dos Campos-SP (BR)

(73) Assignees: EMBRAER S.A., São José dos Campos SP (BR); INATEL / FUNDAÇÃO INSTITUTO NACIONAL DE TELECOMUNICAÇÕES, Santa Rita do Sapucai MG (BR)

( * ) Notice: Subject to any disclaimer, the term of this patent is extended or adjusted under 35 U.S.C. 154(b) by 121 days.

(21) Appl. No.: 18/682,374

(22) PCT Filed: Aug. 13, 2021

(86) PCT No.: PCT/BR2021/050342
§ 371 (c)(1),
(2) Date: Feb. 8, 2024

(87) PCT Pub. No.: WO2023/015365
PCT Pub. Date: Feb. 16, 2023

(65) Prior Publication Data

US 2025/0233318 A1 Jul. 17, 2025

(51) Int. Cl.
*H01Q 17/00* (2006.01)
*H01Q 1/28* (2006.01)

(52) U.S. Cl.
CPC ............. *H01Q 17/00* (2013.01); *H01Q 1/286* (2013.01)

(58) Field of Classification Search
CPC ............................... H01Q 1/286; H01Q 17/00
See application file for complete search history.

(56) References Cited

U.S. PATENT DOCUMENTS 3,564,553 A 2/1971 Leonard
H1219 H 8/1993 Miller
(Continued)

FOREIGN PATENT DOCUMENTS

CN 207052744 U 2/2018
CN 110380225 A * 10/2019 ........... H01Q 17/008
(Continued)

OTHER PUBLICATIONS

International Search Report for PCT/BR2021/050342, mailed Aug. 31, 2021, 4 pages.
(Continued)

*Primary Examiner* — Daniel Munoz
(74) *Attorney, Agent, or Firm* — Nixon & Vanderhye P.C.

(57) ABSTRACT

Method for compensate cavity effect in aircraft embedded antenna impedance and Embedded antenna array for aircraft” The present invention relates to a method for compensate cavity effect in aircraft embedded antenna impedance by using radiofrequency (RF) absorber materials applied to entirely embedded antennas (non-protruding installation) particularly used in aircraft. The invention also
(Continued)

refers to embedded antenna arrays for aircraft using radiofrequency (RF) absorber materials to enhance and/or optimize its impedance matching.

15 Claims, 7 Drawing Sheets

(56) References Cited

U.S. PATENT DOCUMENTS

| | | | | |
|---|---|---|---|---|
| 7,852,280 | B2 | 12/2010 | Zink et al. | |
| 9,490,532 | B2 | 11/2016 | Maruyama | |
| 2020/0212548 | A1* | 7/2020 | Imamura | H01Q 1/22 |
| 2021/0167509 | A1 | 6/2021 | Conway et al. | |

FOREIGN PATENT DOCUMENTS

| | | | |
|---|---|---|---|
| KR | 101843305 | B1 | 5/2018 |
| WO | 2005084406 | A2 | 9/2005 |
| WO | 2020028579 | A1 | 2/2020 |

OTHER PUBLICATIONS

Written Opinion of the ISA for PCT/BR2021/050342, mailed Aug. 31, 2021, 4 pages.

Extended European Search Report issued in EP Application No. 21953037.5 dated Mar. 10, 2025.

Degery "Comprehensive modeling of an embedded GPS patch antenna" 2014 IEEE Conference on Antenna Measurements & Applications (CAMA) pp. 1-3, doi: 10.1109/CAMA.2014.7003321, 2014.

* cited by examiner

METHOD FOR COMPENSATE CAVITY EFFECT IN AIRCRAFT EMBEDDED ANTENNA IMPEDANCE AND EMBEDDED ANTENNA ARRAY FOR AIRCRAFT

CROSS-REFERENCE TO RELATED APPLICATION

This application is the U.S. national phase of International Application No. PCT/BR2021/050342 filed Aug. 13, 2021, which designated the U.S., the entire contents of which are hereby incorporated by reference.

The present invention relates to a method for compensate cavity effect in aircraft embedded antenna impedance by using radiofrequency (RF) absorber materials applied to partially or entirely embedded antennas (non-protruding installation) particularly used in aircraft. The invention also refers to embedded antenna arrays for aircraft using radiofrequency (RF) absorber materials to enhance and/or optimize its impedance matching.

BACKGROUND

Nowadays the antennas commercially available for aircraft installation necessarily need to have an external protruding part in the aircraft fuselage or similar structure, in order to guarantee their properly performance.

In these cases, the antennas for aircraft, especially those antennas used for communications at lower frequencies, has a design with low profile or blade antennas with the intention to not cause high level of drag. The design for those antennas also uses light materials in order to keep the weight as low as possible. However, they are always outside the fuselage, producing drags and compromising the aesthetics of the aircraft.

In this sense, the present state of the art for aircraft antennas does not allow non-protruding installation solutions for most types of antennas, specifically, it does not allow embedment installation of antennas for aircraft.

It is due to antenna embedment process into a cavity constructed with conductive materials (metal or composites) in which the antenna input impedance is strongly influenced and typically deteriorated by the internal reflections in the near field region, reducing its performance. In general, there is an increase in the reactive part and decreasing in the resistive part of the embedded antenna input impedance, generating impedance mismatching to the RF transmitter.

It is known that the antenna radiated power is maximized by increasing the impedance matching between antenna and transmitter, thus minimizing the antenna reflected power. In this manner, it is required to take the radiating structure to resonance, by means of ensuring an acceptable input impedance matching with the RF transmitter and transmission lines between them.

There are plenty of techniques for impedance matching, including microstrip and coaxial stubs, Jumped elements, impedance transformers and so on. Although these techniques could improve the impedance matching, in many times, they degrade the antenna radiation pattern properties due to its interference in the radiation structure. Additionally, these impedance matching networks are fragile, cumbersome, narrowband and introduce insertion loss to the system.

Absorber materials are typically applied to reduce side lobe level in parabolic antennas. They have also been proposed to increase the cavity-backed antenna directivity, mainly in broadband printed spiral antennas, by means of reducing and even nulling the radiation energy levels at non-desired directions. In this way, since the antenna directivity is the ratio between the power density that the antenna radiates in the direction of its strongest emission and the power density of an ideal isotropic radiator (which emits uniformly in all directions) radiating the same total power, it gets higher values as the radiation at non-desired directions is reduced.

However, considering an embedded antenna design, multiples reflections inside the cavity deteriorate the antenna radiation pattern at different levels, depending on the operating frequency. In this case, RF absorber materials are placed in the antenna plane, or in the cavity lateral walls, or underneath antenna radiating elements to absorb the electromagnetic wave as a load. It means that in these cases, the absorber usually deteriorates the antenna performance to an unacceptable level to be used as a non-protruding antennas in aircraft and therefore it was not found before as a solution for a practical antenna design.

Objectives of the Invention

Thus, the present invention aims to provide a method for compensate cavity effect in aircraft embedded antenna impedance wherein radiofrequency (RF) absorber materials are used to embedded antennas, which are embedded into a non-resonant cavity. For the intended operating frequency band, the RF absorber material is being used for impedance matching purposes in order to compensate the cavity wall effect on the antenna impedance, even using the absorber in the cavity walls and not as a part of the antenna radiating element.

The present invention also aims to provide multiple embedded antenna arrays for aircraft for enhancing and/or optimizing its impedance matching by using the radiofrequency (RF) absorber materials. The antennas design can be installed without any protruding part in the aircraft external surface.

BRIEF DESCRIPTION OF THE INVENTION

The aim of this invention is a method for compensate cavity effect in aircraft embedded antenna impedance, characterized by comprising the steps of:

(i) provide an embedment cavity;

(ii) placing radiofrequency absorber material inside the embedment cavity enhancing the embedded antenna input impedance matching.

It is also an aim of this invention an embedded antenna array for aircraft, characterized by comprising an embedment cavity receiving at least one radiofrequency absorber material placed inside the embedment cavity to enhance the embedded antenna input impedance matching.

DETAILED DESCRIPTION OF THE INVENTION

Figure 1:
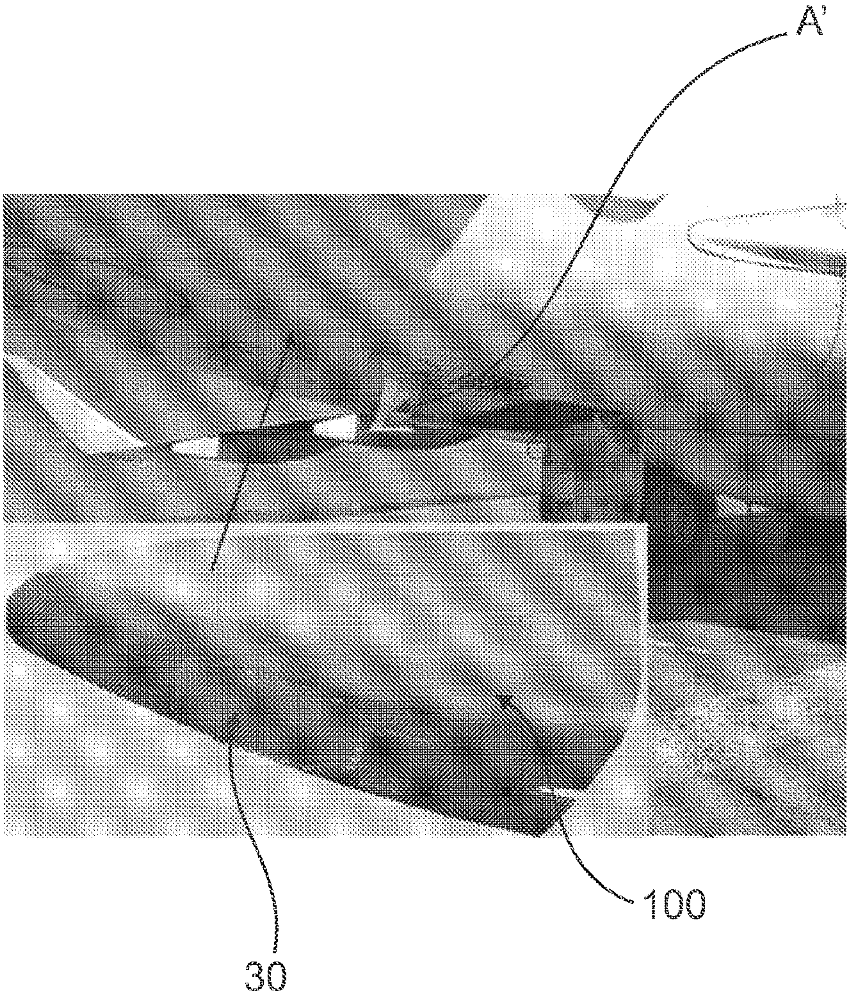
FIG. 1—illustrates the aircraft fuselage comprising a protruding antenna externally installed as known in the prior art and the embedded antenna of the present invention positioned at the similar region of aircraft fuselage.

Antennas (A') commercially available for aircraft installation necessarily need to have an external protruding part in the aircraft fuselage, as can be seen in FIG. 1. Usually, an aircraft has several antennas A' all over the fuselage skin, each one for a specific purpose, meaning that several protruding parts are spreaded across the aircraft fuselage. As a result, these antennas A' are responsible for producing drag and they compromises the aesthetics of the aircraft.

Figure 2:
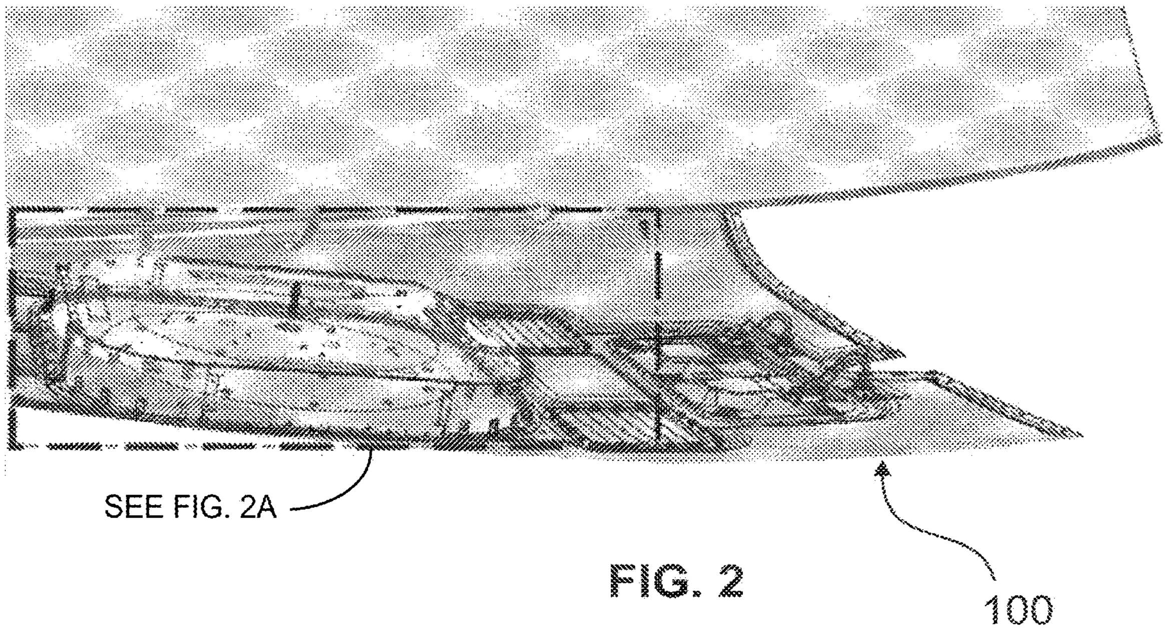
FIGS. 2 and 2A—illustrate the embedded antenna of the present invention positioned inside the aircraft fuselage.
Figure 2A:
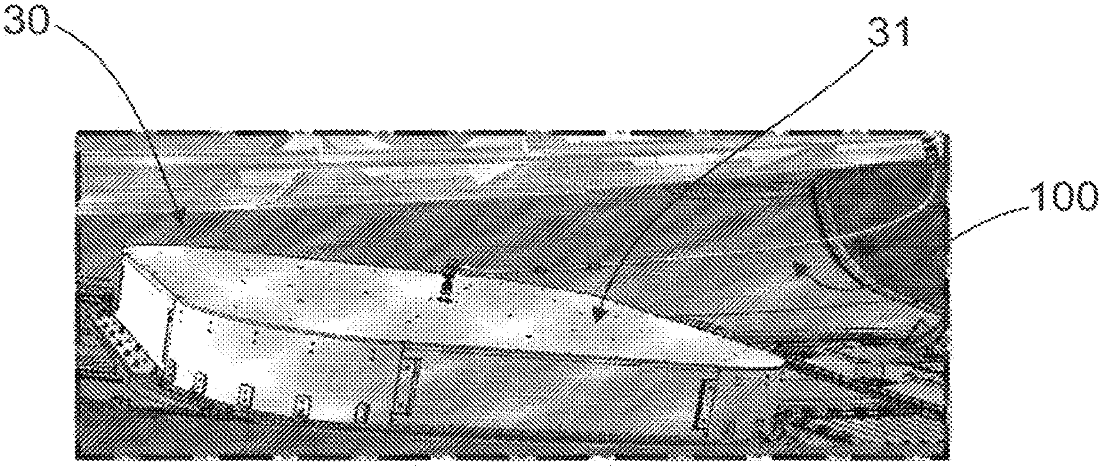

It is an object of the present invention, an embedded antenna 30 for aircraft, developed to extinguish the external protruding part of the antenna, since the entire antenna 30 is positioned inside the aircraft fuselage in an embedment cavity 31, as shown in FIGS. 1, 2 and detail A.

Figure 3:
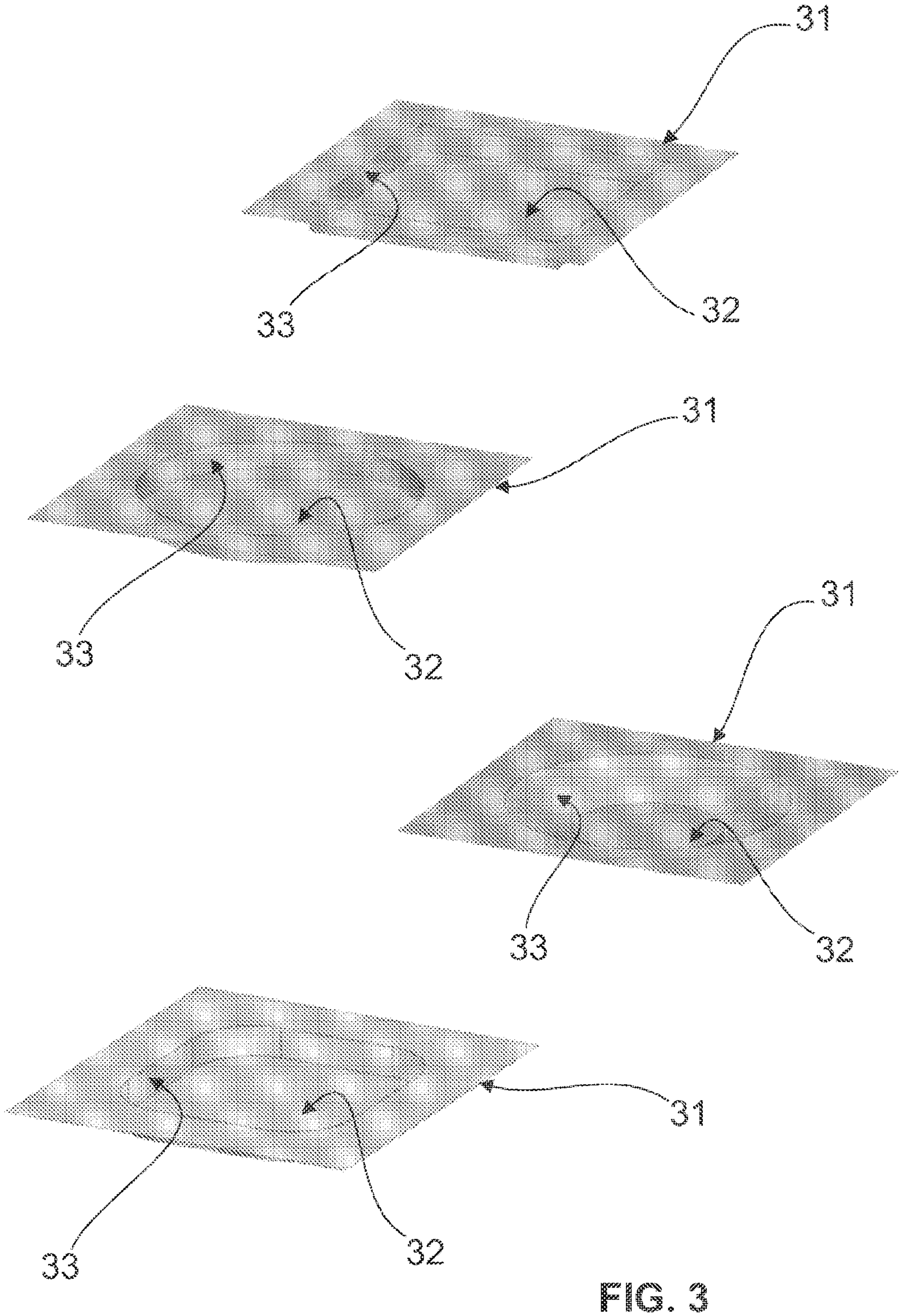
FIG. 3—is a perspective view of a plurality of embedment cavities for the embedded antenna of the present invention.

In this sense, the embedment cavity 31 of the embedded antenna 30 can have a plurality of shapes, as illustrated in FIG. 3. Each shape must have cavity lateral walls 33 and bottom 32, wherein the antenna components are positioned, including all elements that compose the active radiating part of the antenna and its interface connection and cables.

Figure 4:
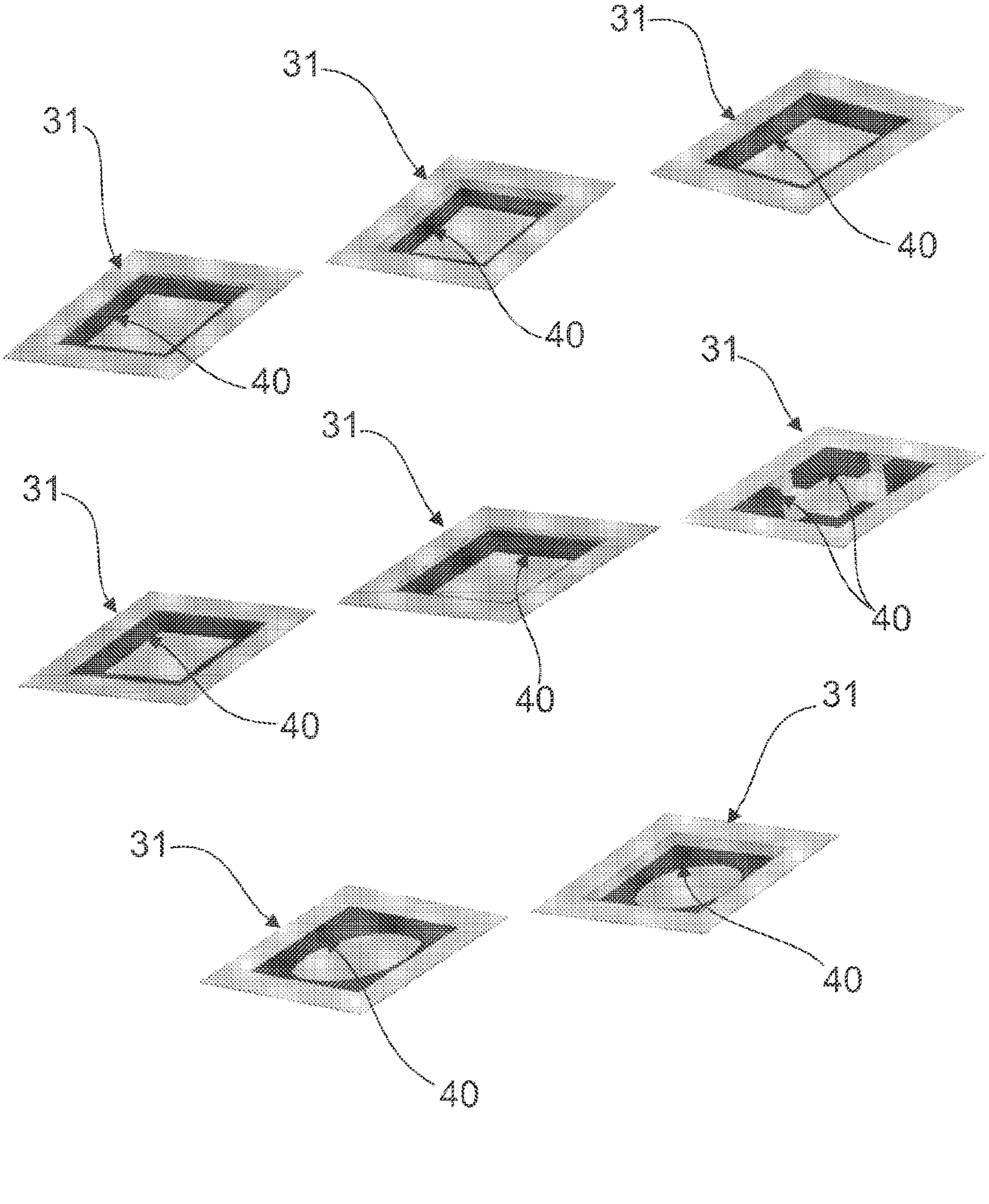
FIG. 4—is a perspective view of absorbers possible locations with different geometries.

Besides the antenna components, the embedment cavity 31 also receives at least one radiofrequency absorber material 40, 41 (FIG. 4) placed inside the embedment cavity 31 to enhance the embedded antenna input impedance matching by absorbing electromagnetic wave as a load and eliminating multiple reflections of the waves that mismatch the antenna syntonization at the intended operating frequency band.

Figure 5:
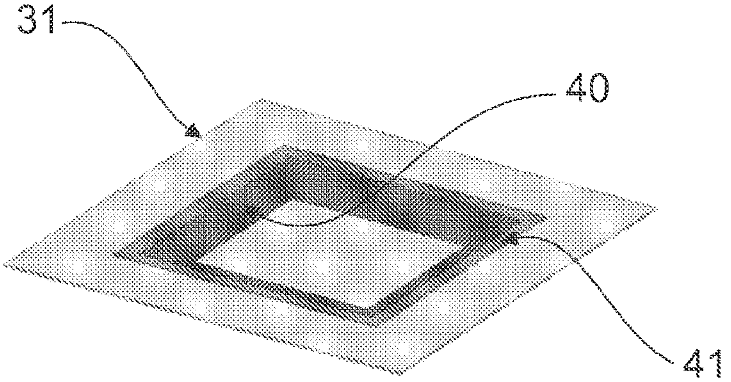
FIG. 5—is a perspective view of an embedment cavity for embedded antenna with more than one absorber material.
Figure 6:
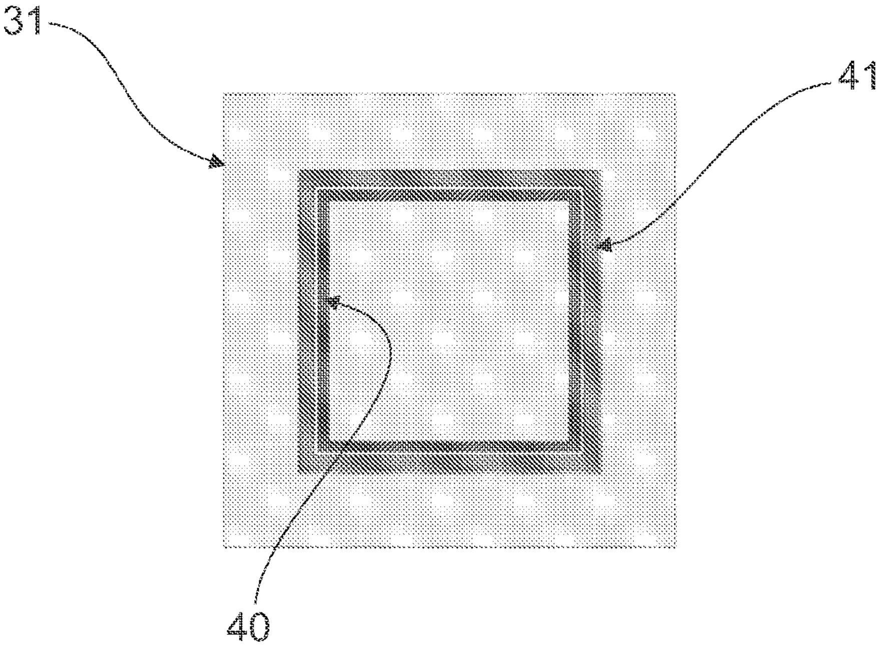
FIG. 6—is an upper view of an embedment cavity for embedded antenna with more than one absorber material illustrated in FIG. 5.

The radiofrequency absorber material 40, 41 can have a plurality of geometries and sizes to fit with the embedment cavity 31 several shapes. Further, the embedment cavity 31 can receive more than one radiofrequency absorber material 40, 41, as can be seen in FIGS. 5 and 6, placed inside the embedment cavity 31 to enhance the embedded antenna 30 input impedance matching. Thus, the present invention can use any kind of RF absorber and it is also possible to use absorbers with different electromagnetic characteristics or a combination of different types of absorbers, where the geometry and the amount of the absorbers are adjusted in function of their electromagnetic characteristics.

Another object of this invention is a method for compensate cavity effect in aircraft embedded antenna 30 impedance. This method comprises the steps of:

(i) provide an embedment cavity 31;

(ii) placing radiofrequency absorber material 40, 41 inside the embedment cavity 31 enhancing the embedded antenna 30 input impedance matching.

The radiofrequency absorber material 40, 41 is used to compensate the cavity effect in the antenna impedance due to its embedment and, consequently, significantly enhancing its input impedance matching.

The proposed method is independent of cavity 31 format and/or antenna topology. The radiofrequency absorber material 40, 41 is installed in the embedment cavity 31 and its geometry, quantity and position will depend on the absorber electromagnetic characteristics and the antenna required parameters.

The radiofrequency absorber material 40, 41 is placed in the cavity lateral walls 33 or bottom 32, according to a trade-off between the cavity embedment effect reduction and absorber quantity (volume).

It is important to note that this method is applied for any frequency range including VLF, LF, VHF, UHF and SHF.

Moreover, the method and the embedded antenna 30, objects of the present invention improve the input impedance matching for the antenna and/or antenna array and, consequently, enhance its radiation efficiency and gain; mechanical robustness; simplicity and functional frequency band, regardless the antenna topology.

Figure 9:
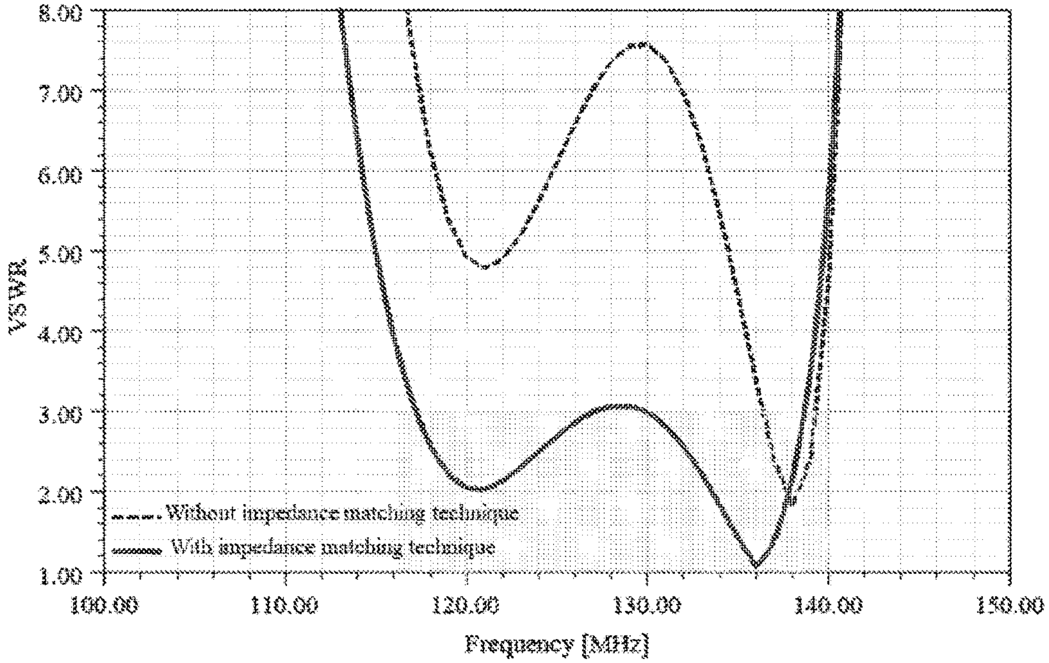
FIG. 9—is a graphic demonstrating the efficiency of the proposed invention, by means of full-wave numerical simulations of the input impedance matching enhancement, as a function of VSWR (Voltage Standing Wave Ratio).

FIG. 9 shows how the addition of absorbers decreases the level of VSWR in the frequency range target for the antenna operation. The lower value as possible for VSWR, the better is the antenna impedance matching. In this sense, the graphic of FIG. 9 demonstrates the efficiency of the proposed invention, by means of full-wave numerical simulations of the input impedance matching enhancement, as a function of VSWR. Therefore, the innovative use of the absorbers enables the construction of antennas with appropriate characteristics for installation without protuberances and complying with the aircraft requirements.

Figure 7:
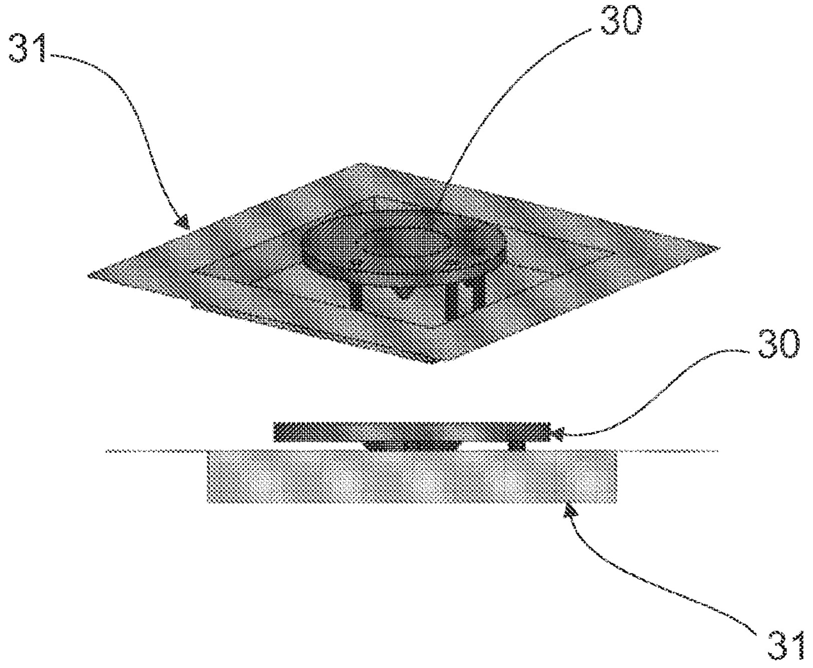
FIG. 7—is a perspective and front view of partially embedded antennas.
Figure 8:
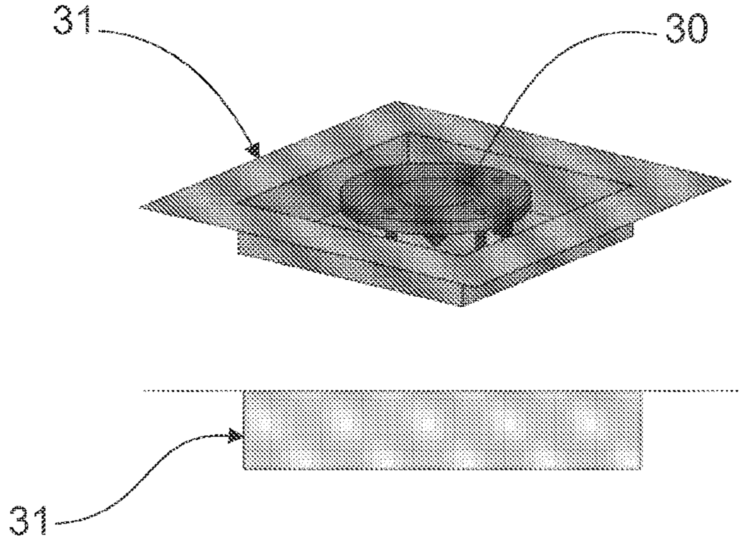
FIG. 8—is a perspective and front view of fully embedded antennas.

Furthermore, particularly for transport applications, including aerospace vehicles, the invention provides a fully or partially antenna and/or antenna array embedment (non-protruding installations), drag reduction, fuel-savings, maintenance cost reduction, aesthetic and safety improvements, as illustrated in FIGS. 7 and 8.

So, having described an example of a preferred embodiment, it should be understood that the scope of this invention covers other possible variations, being limited only by the content of the attached claims, including the possible equivalents.

The invention claimed is:

1. Method for compensating cavity effect in aircraft embedded antenna impedance, comprising:

(i) providing an antenna embedment non-resonant cavity configured for positioning inside an aircraft fuselage thereby reducing or eliminating antenna protrusion, the antenna embedment cavity comprising cavity lateral walls and a cavity bottom forming a depression; and (ii) placing radiofrequency absorber material inside the embedment non-resonant cavity thereby enhancing embedded antenna input impedance matching, wherein the radiofrequency absorber material is placed on at least a portion of the cavity lateral walls and does not cover the cavity bottom.

2. Method, according to claim 1, further including operating at any frequency range including VLF, LF, VHF, UHF and SHF.

3. Embedded antenna array for aircraft, comprising:

an antenna embedment conductive cavity configured for positioning inside an aircraft fuselage thereby reducing or eliminating antenna protrusion, the antenna embedment conductive cavity further configured to receive at least one radiofrequency absorber material placed inside the embedment conductive cavity to enhance embedded antenna input impedance matching, the antenna embedment cavity being non-resonant and comprising cavity lateral walls and a cavity bottom forming a depression, wherein the at least one radiofrequency absorber material comprises plural concentric absorbers arranged to frame the depression.

4. Embedded antenna, according to claim 3, wherein the antenna embedment conductive cavity can have a plurality of shapes.

5. Embedded antenna, according to claim 4, wherein the radiofrequency absorber material can have a plurality of geometries and sizes.

6. Embedded antenna, according to claim 3, wherein the antenna embedment conductive cavity receives more than one radiofrequency absorber material placed inside the antenna embedment conductive cavity to enhance the embedded antenna input impedance matching.

7. The embedded antenna of claim 3 wherein the at least one radiofrequency absorber material placed inside the antenna embedment conductive cavity enhances the embedded antenna input impedance matching by absorbing electromagnetic wave as a load and eliminating multiple reflections of waves that mismatch antenna sintonization at an intended operating frequency band.

8. A non-protruding aircraft antenna comprising:

an antenna having an input impedance at an intended operating frequency band;

an antenna embedment cavity configured for positioning inside an aircraft fuselage, the antenna disposed within the antenna embedment cavity, the antenna embedment cavity being non-resonant and comprising cavity lateral walls and a cavity bottom forming a depression, the walls and bottom configured to accept an active radiating part of the antenna; and at least one radiofrequency absorber material disposed within the antenna embedment cavity, the radiofrequency absorber material matching the input impedance of the antenna by absorbing electromagnetic waves as a load and eliminating multiple reflections of the electromagnetic waves, wherein the at least one radiofrequency absorber material is disposed on at least a portion of the cavity lateral walls and does not cover the cavity bottom.

9. The non-protruding aircraft antenna of claim 8 wherein the cavity bottom is planar.

10. The non-protruding aircraft antenna of claim 8 wherein the cavity lateral walls form a rectangular depression.

11. The non-protruding aircraft antenna of claim 8 wherein the cavity lateral walls form a circular depression.

12. The non-protruding aircraft antenna of claim 8 wherein the at least one radiofrequency absorber comprises plural concentric absorbers arranged to frame the depression.

13. The non-protruding aircraft antenna of claim 12 wherein the plural concentric absorbers have different electromagnetic characteristics.

14. The non-protruding aircraft antenna of claim 8 wherein the antenna comprises a disc structure with spacers supporting the disc structure within the depression.

15. The non-protruding aircraft antenna of claim 8 wherein the cavity is conductive.

* * * * *